US011067829B2

(12) United States Patent
Steele et al.

(10) Patent No.: US 11,067,829 B2
(45) Date of Patent: Jul. 20, 2021

(54) PROGRESSIVE LENS OPTICAL DESIGN DETERMINING SYSTEM

(71) Applicant: Crossbows Optical Ltd., Craigavon (GB)

(72) Inventors: Trevor Steele, Lurgan (GB); Hugh McLoughlin, Lurgan (GB); Patrick McCollum, Lurgan (GB); James McCartney, Lurgan (GB); George Foster, Lurgan (GB)

(73) Assignee: Crossbows Optical Ltd., Craigavon (GB)

( * ) Notice: Subject to any disclaimer, the term of this patent is extended or adjusted under 35 U.S.C. 154(b) by 0 days.

(21) Appl. No.: 15/310,041

(22) PCT Filed: May 5, 2015

(86) PCT No.: PCT/EP2015/059879
§ 371 (c)(1),
(2) Date: Nov. 9, 2016

(87) PCT Pub. No.: WO2015/169813
PCT Pub. Date: Nov. 12, 2015

(65) Prior Publication Data
US 2017/0153462 A1 Jun. 1, 2017

(30) Foreign Application Priority Data
May 9, 2014 (EP) .................... 14167805

(51) Int. Cl.
*G02C 7/02* (2006.01)
*G02C 7/06* (2006.01)

(52) U.S. Cl.
CPC ............ *G02C 7/027* (2013.01); *G02C 7/024* (2013.01); *G02C 7/025* (2013.01); *G02C 7/028* (2013.01); *G02C 7/066* (2013.01)

(58) Field of Classification Search
CPC .......... G02C 7/02; G02C 7/024; G02C 7/025; G02C 7/027; G02C 7/028; G02C 7/06;
(Continued)

(56) References Cited

U.S. PATENT DOCUMENTS

| 2008/0282183 A1 | 11/2008 | Fisher et al. | |
| 2010/0157242 A1* | 6/2010 | Esser et al. | G02C 7/02 351/177 |
| 2015/0049304 A1* | 2/2015 | Cussac | G02C 7/028 351/159.75 |

FOREIGN PATENT DOCUMENTS

| FR | 2988494 A1 | 9/2013 |
| WO | 2008089995 A1 | 7/2008 |

(Continued)

OTHER PUBLICATIONS

ISR/WO for PCT/EP2015/059879 dated Jul. 17, 2015.

*Primary Examiner* — Jie Lei
(74) *Attorney, Agent, or Firm* — Oblon, McClelland, Maier & Neustadt, L.L.P.

(57) ABSTRACT

Embodiments of the invention provide patients with premium progressive lenses that are tailor-made to his or her specific and unique requirements and preferences. An interactive progressive lens optical design determining provides design technology that allows patients or eye care professionals to alter a progressive lens optical design in real-time, while continually displaying the selected lens' optical performance, until the most suitable lens has been designed. The progressive lens optical design determining software mixes and blends a number of cornerstone designs in varying ratios to achieve the desired lens.

20 Claims, 13 Drawing Sheets

(58) Field of Classification Search
CPC ........ G02C 7/061; G02C 7/063; G02C 7/066;
G02C 13/003; G02C 13/005; G06Q
30/0621; G06Q 30/0633; G06F 17/50
USPC ............ 351/159.41, 159.42, 159.74, 159.75,
351/159.76, 159.77; 703/1, 2; 705/26.5;
715/700, 771, 772, 788, 813, 833
See application file for complete search history.

(56) References Cited

FOREIGN PATENT DOCUMENTS

| | | |
|---|---|---|
| WO | 2010084019 A1 | 7/2010 |
| WO | 2014015344 A2 | 1/2014 |

\* cited by examiner

Hard distance
Hard reading

Soft distance
Soft reading

Soft distance
Hard reading

Hard distance
Soft reading ical design is suitable for specific user's need, comprising:

PROGRESSIVE LENS OPTICAL DESIGN DETERMINING SYSTEM

TECHNICAL FIELD

Embodiments of the invention are directed, in general, to providing an interactive lens design system and, more particularly, to a system that allows real-time generation of progressive lens designs to more closely match a patient's needs.

BACKGROUND

A progressive lens corrects sight for a range of viewing distances, which can be categorized as near, intermediate, and far. Near distance is associated with the need to see things close up, such as for reading, painting, or doing needlework. Intermediate distance is associated with the need to see things at about arm's length, such as for using a computer monitor, looking at a vehicle dashboard, or talking to others. Far distance is associated with the need to see things beyond arm's length, such as for driving, watching television, or playing sports.

Progressive lenses are configured with each of these vision zones. The lens design may depend upon the wearer's particular needs or preferences and can be tailored to suit the wearer. In addition to providing lenses that can be used for all purposes, progressive lenses may also be designed for a specific task or "lifestyle." For example, an "office" lens may not correct fully for far vision, but will work better than an all-purpose progressive lens for near and intermediate vision needs. Alternatively, a driving lens may not correct fully for near vision, but will work better than an all-purpose progressive lens for far and intermediate vision needs.

All progressive lenses have some unusable areas in which the vision through these areas is distorted. "Harder" designs have larger areas of useful vision, smaller areas of distorted vision, and a faster transition between the two areas. "Softer" designs have smaller areas of useful vision, larger areas of distorted vision, and a slower transition between the two areas. The peak distortion is lower in a softer design, which is usually more comfortable for most wearers.

Existing progressive lens systems offer a set number of progressive lens design choices to users. For example, ten progressive lens designs might be offered and the wearer is limited to selecting only from that set of designs.

BRIEF DESCRIPTION OF THE DRAWINGS

Figure 1:
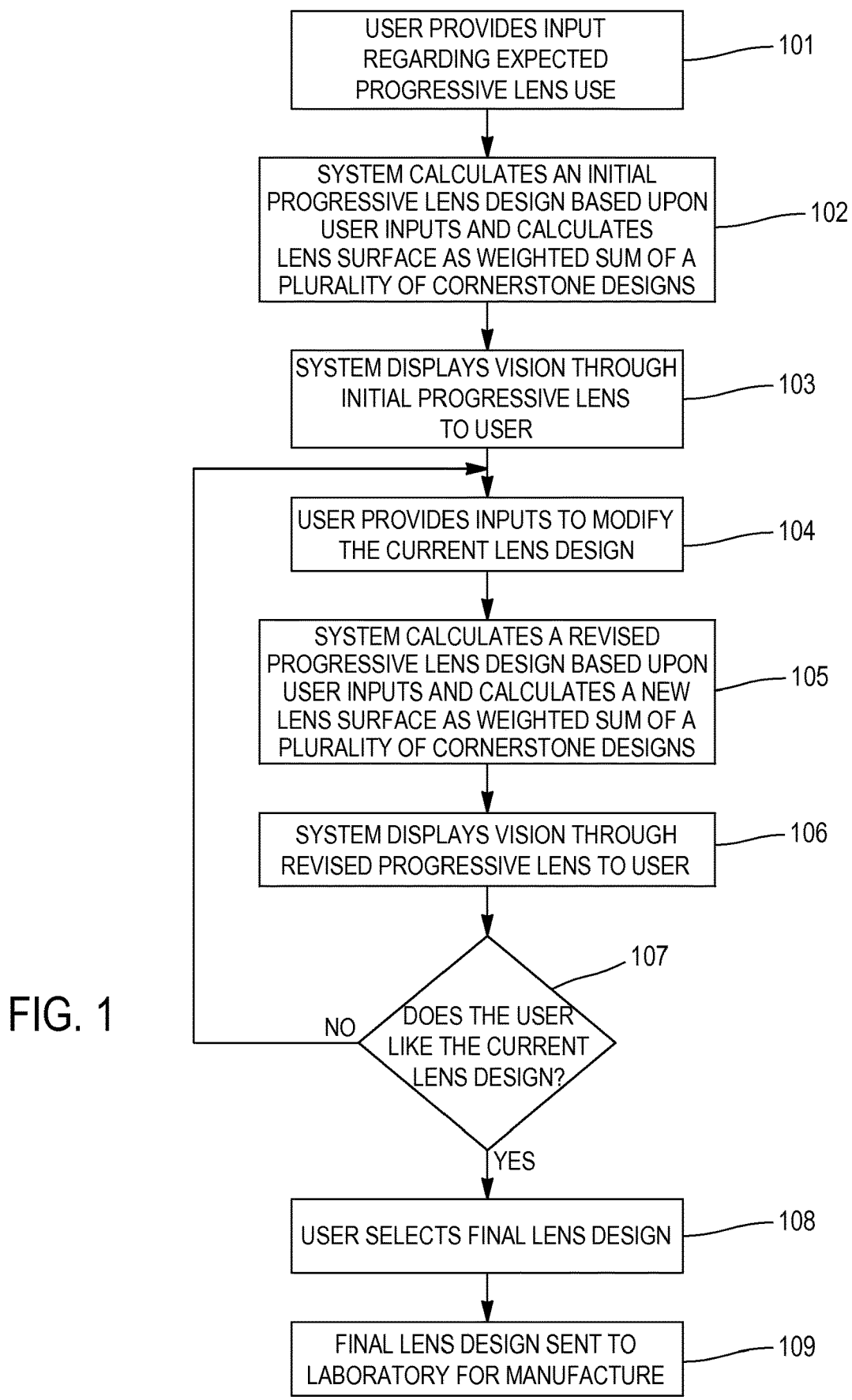

Having thus described the invention in general terms, reference will now be made to the accompanying drawings, wherein:

FIG. 1 is a flowchart illustrating an overview of a process for using the progressive lens design system according to one embodiment.

Figure 2:
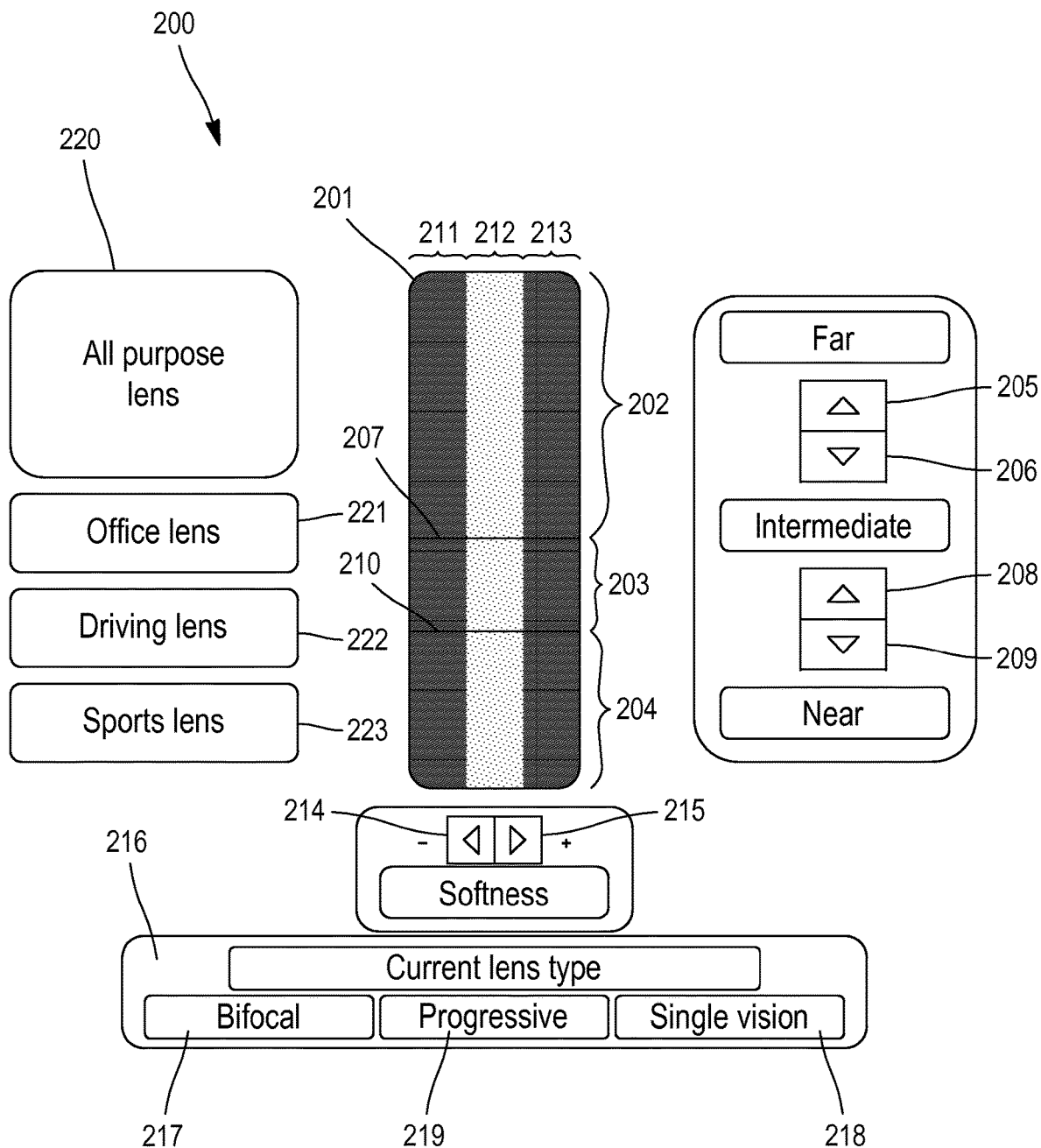

FIG. 2 illustrates a progressive lens zone-tailoring interface according to one embodiment.

Figure 3:
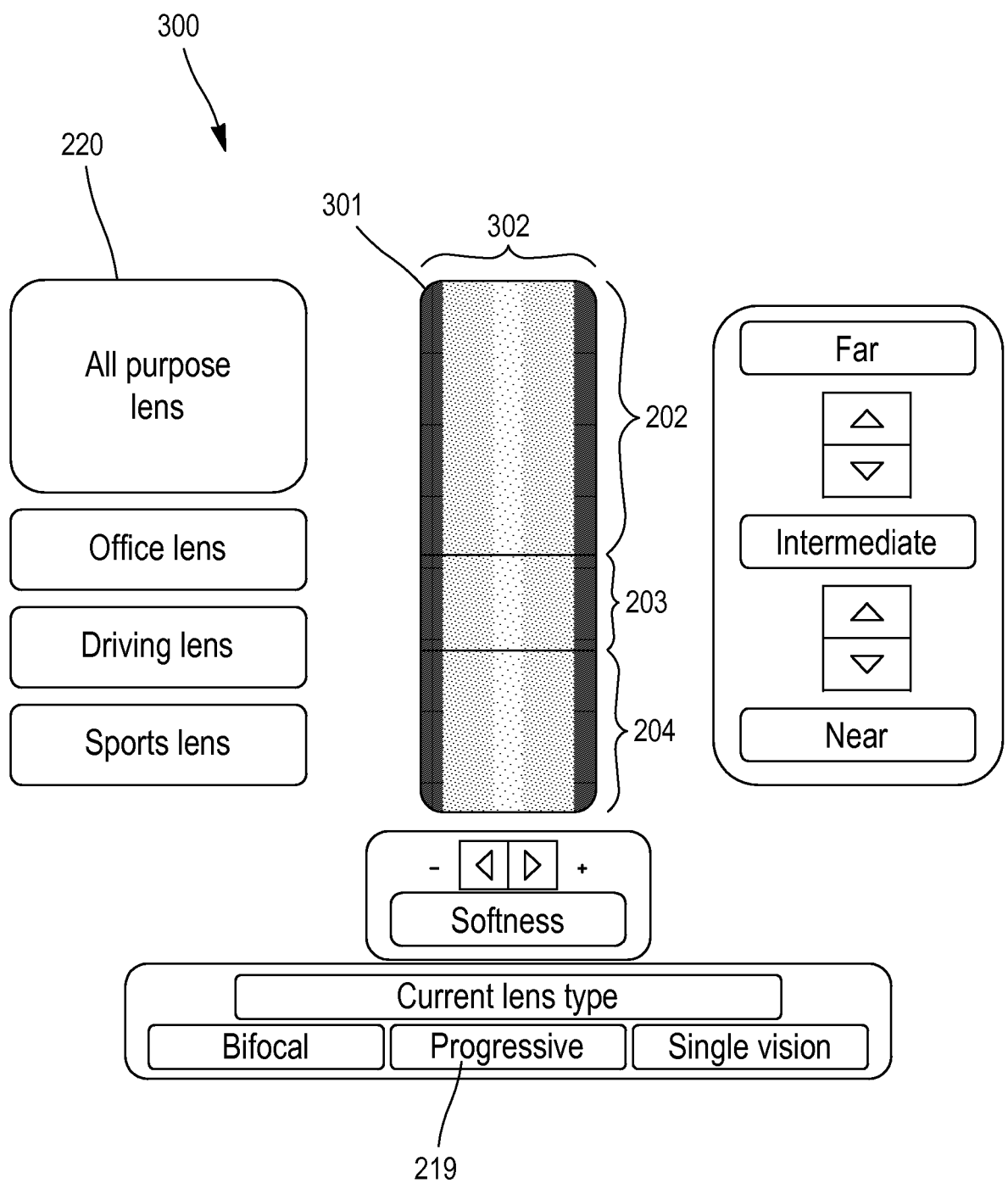

FIG. 3 illustrates a zone-tailoring interface for progressive lens design when a user has selected an all-purpose progressive lens design and indicated that he or she currently uses progressive lenses.

Figure 4:
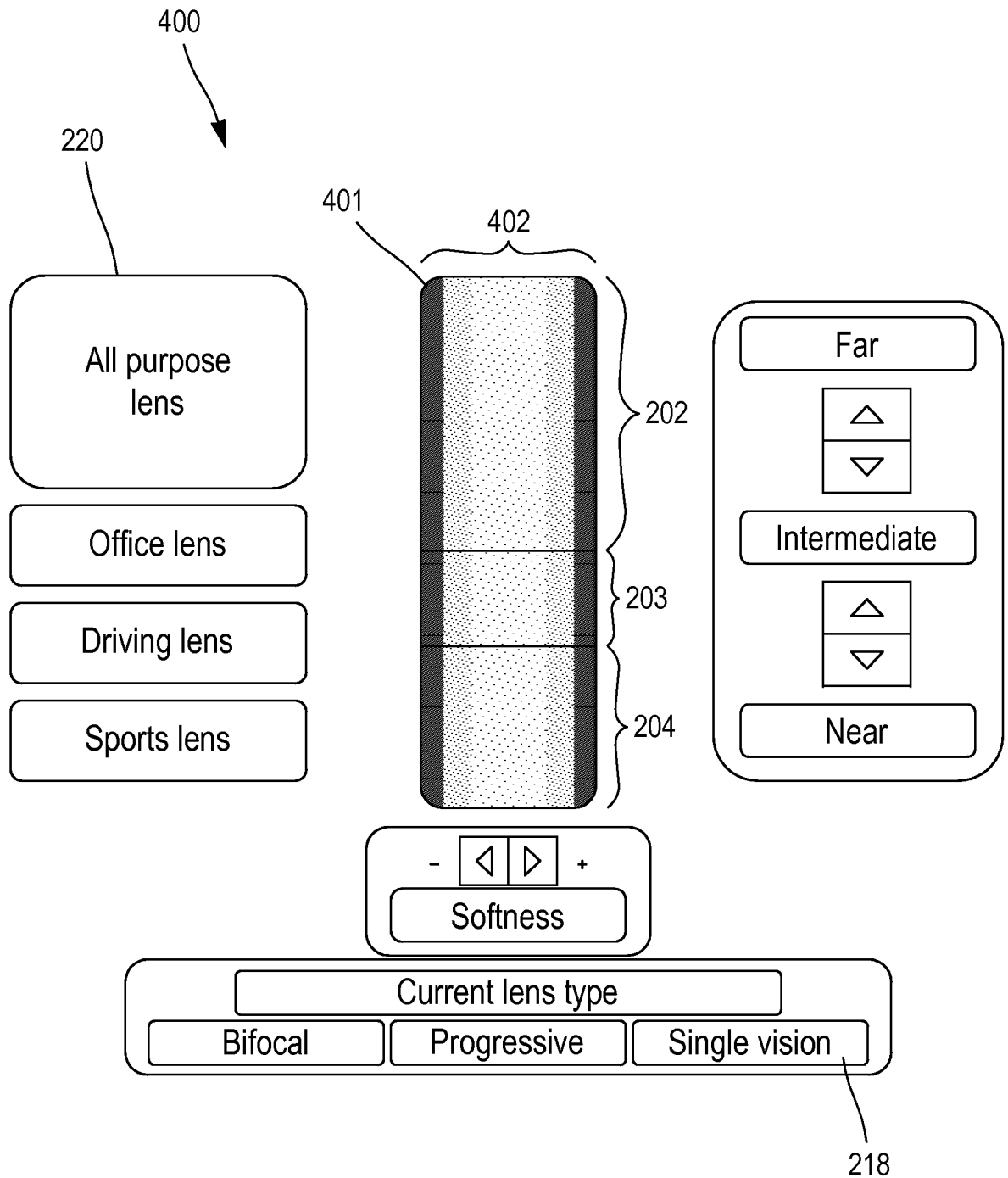

FIG. 4 illustrates a zone-tailoring interface for progressive lens design when a user has selected an all-purpose progressive lens design and indicated that he or she currently uses single-vision lenses.

Figure 5:
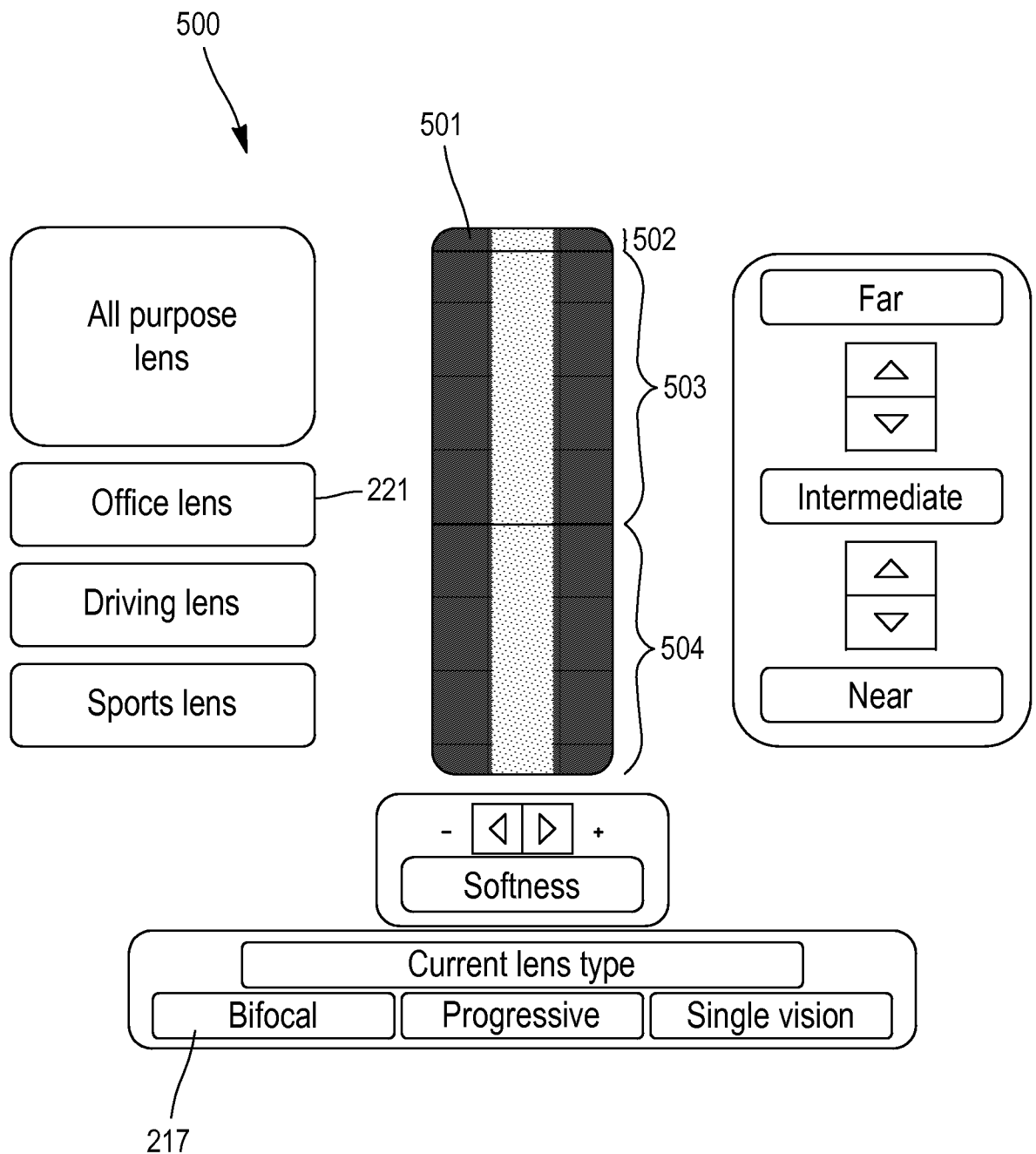

FIG. 5 illustrates a zone-tailoring interface for progressive lens design when a user has selected an office lens design and indicated that he or she currently uses bifocal lenses.

Figure 6:
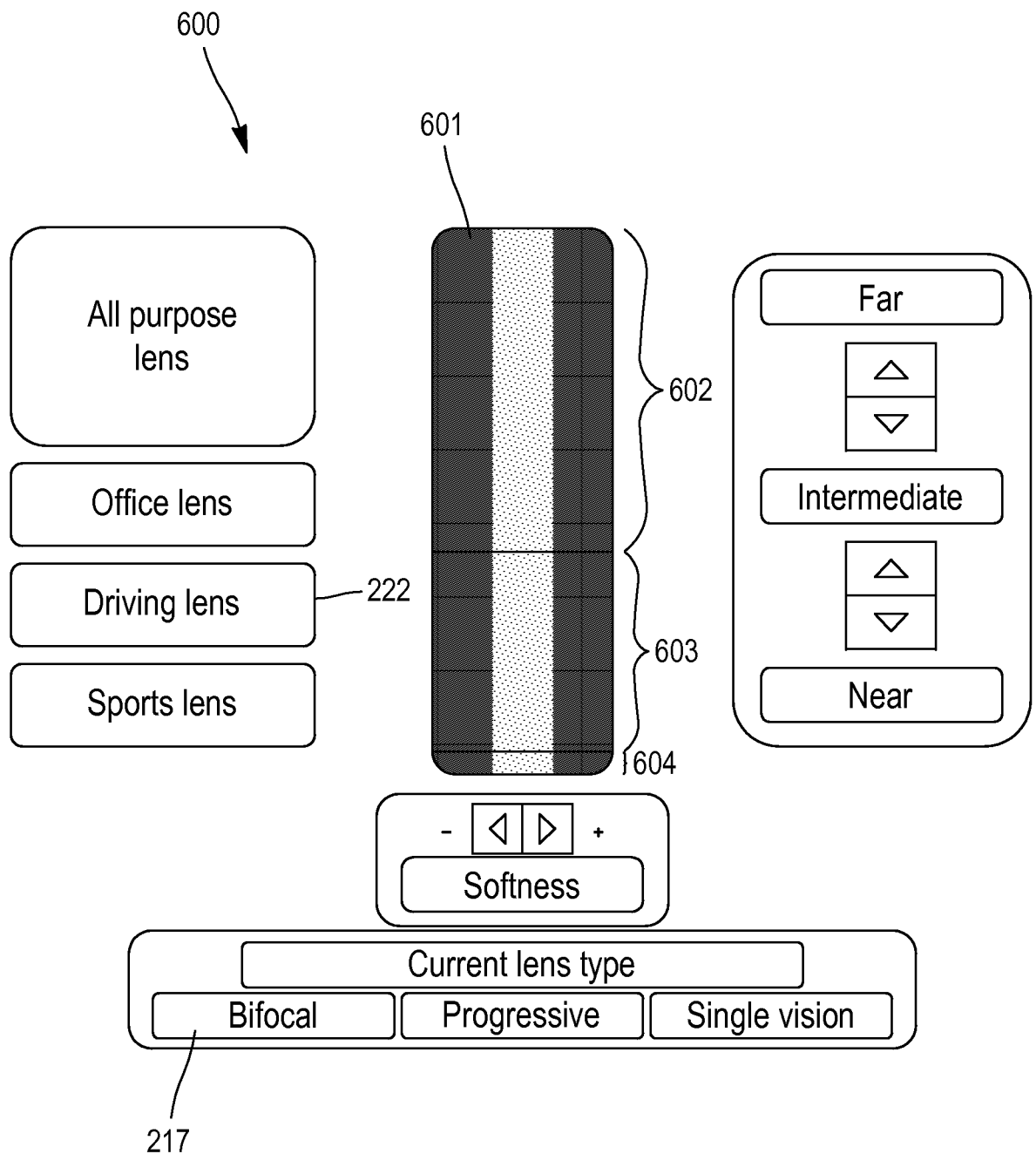

FIG. 6 illustrates a zone-tailoring interface for progressive lens design when a user has selected a driving lens design and indicated that he or she currently uses bifocal lenses.

Figure 7:
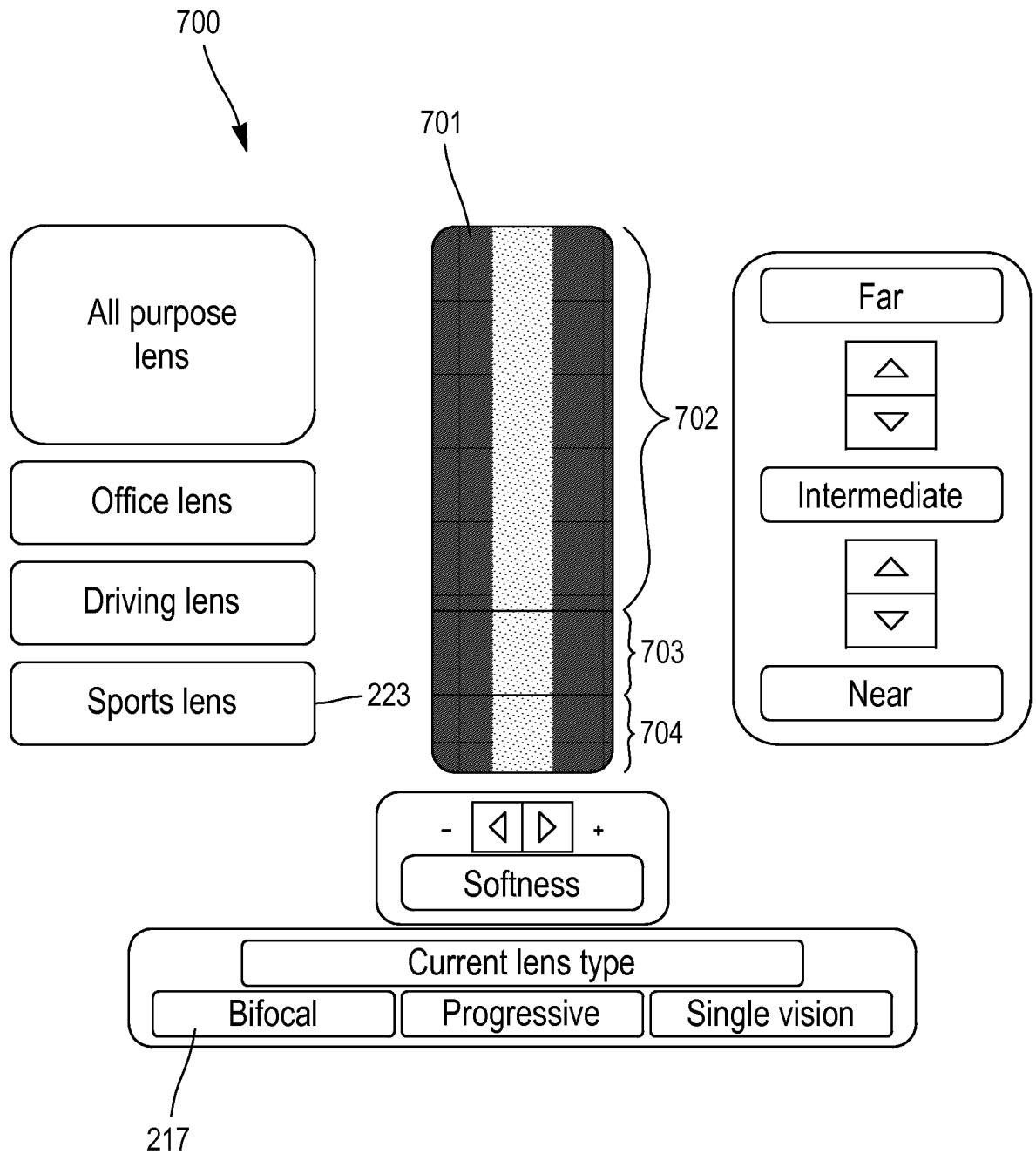

FIG. 7 illustrates a zone-tailoring interface for progressive lens design when a user has selected a sports lens design and indicated that he or she currently uses bifocal lenses.

Figure 8:
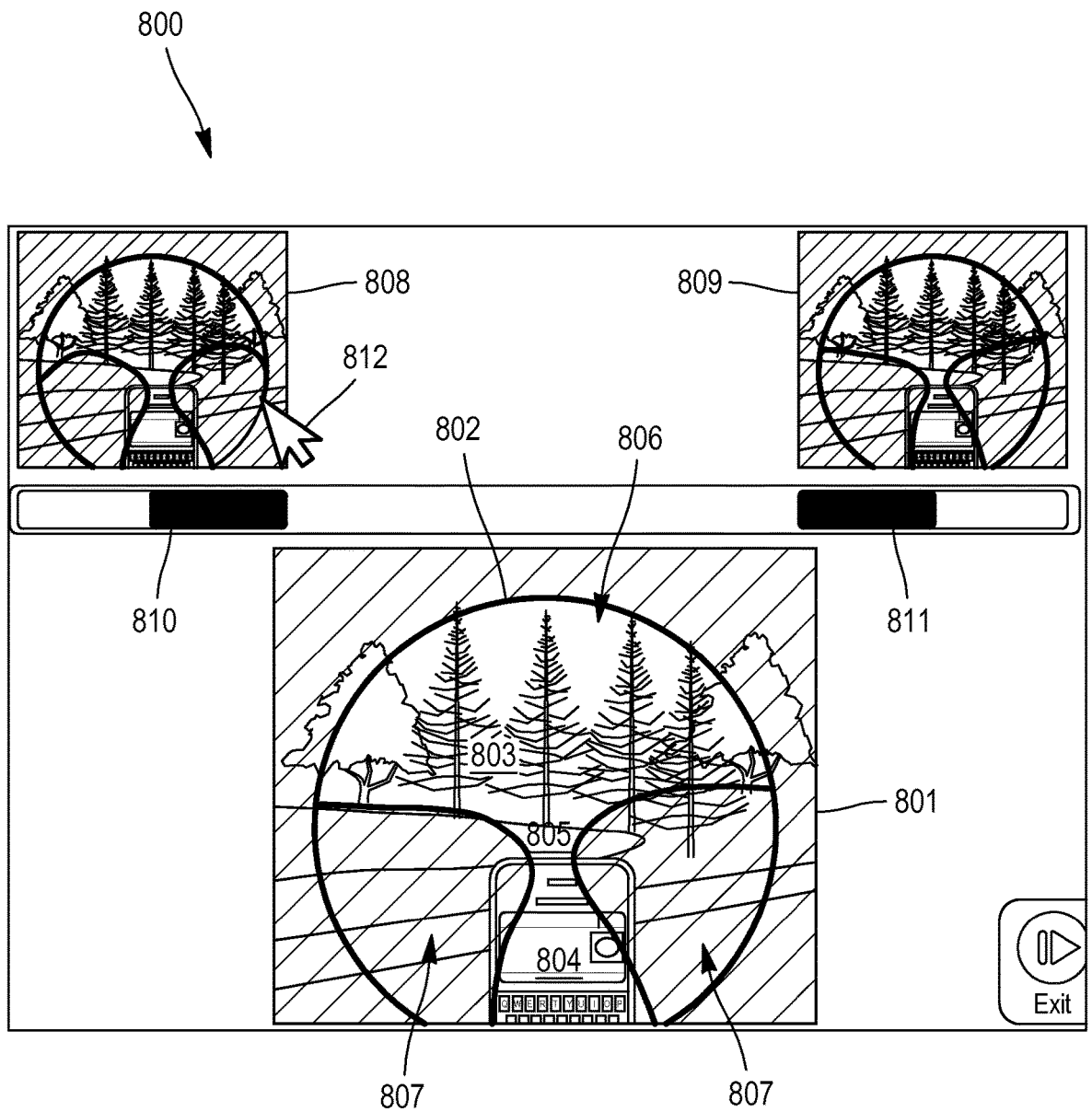

FIG. 8 illustrates a display shown to a user based upon his or her initial progressive lens design using the parameters selected in the zone-tailoring section.

Figure 9:
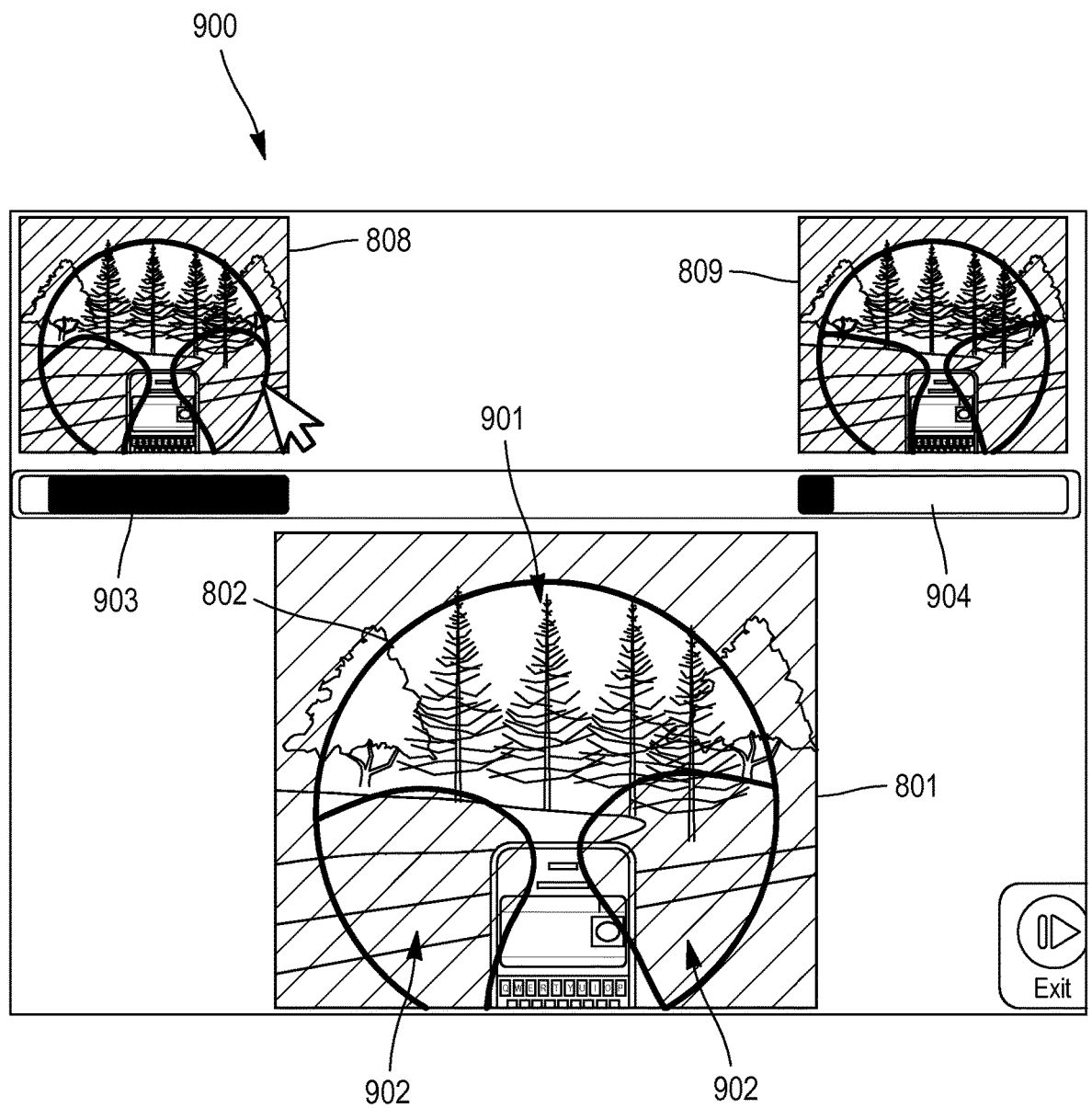

FIG. 9 illustrates a display that corresponds to modified progressive lens display.

Figure 10:
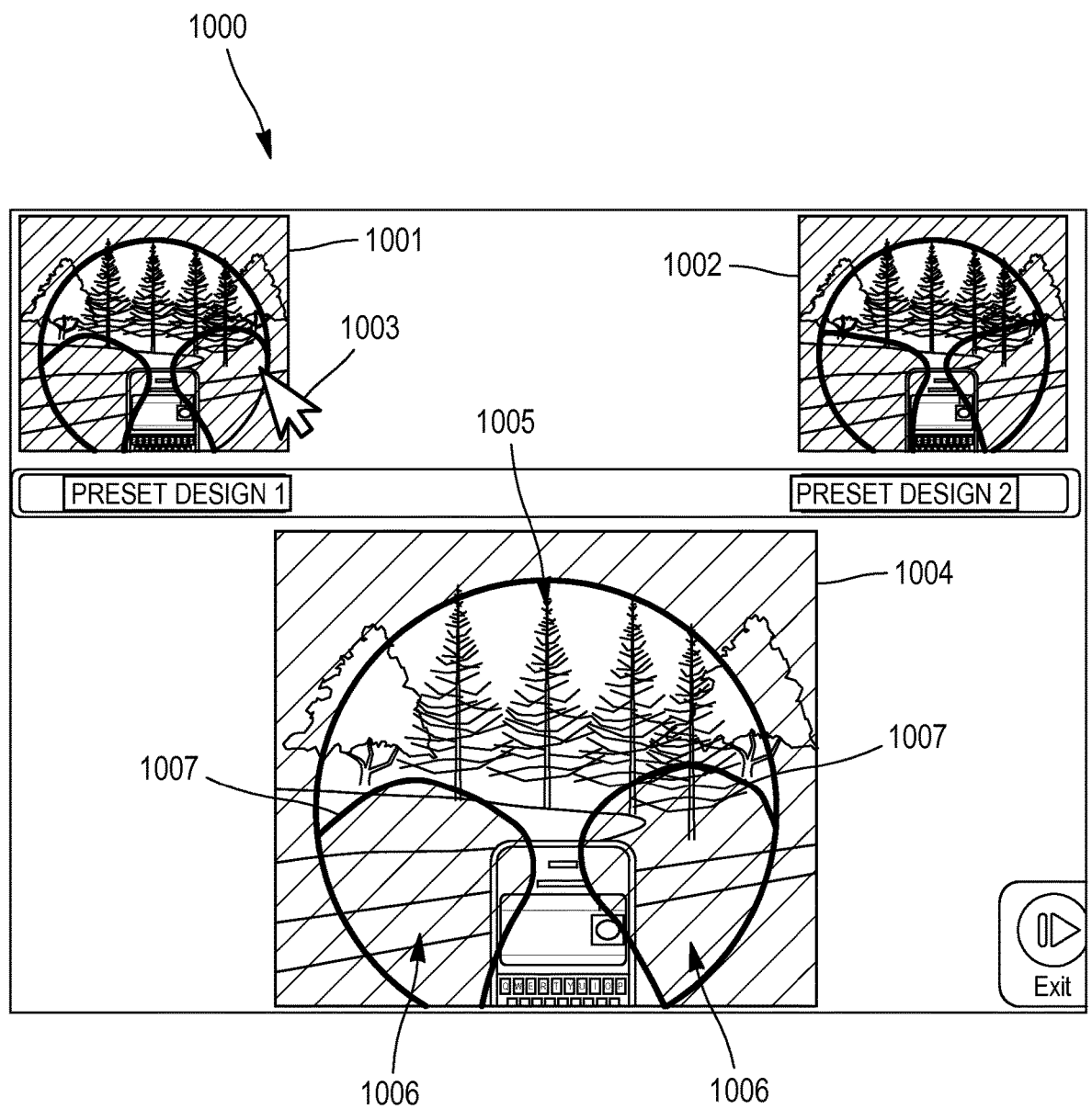

FIG. 10 is an alternative embodiment of an interface for fine tuning of the progressive lens design options generated in the zone tailoring phase.

Figure 11:
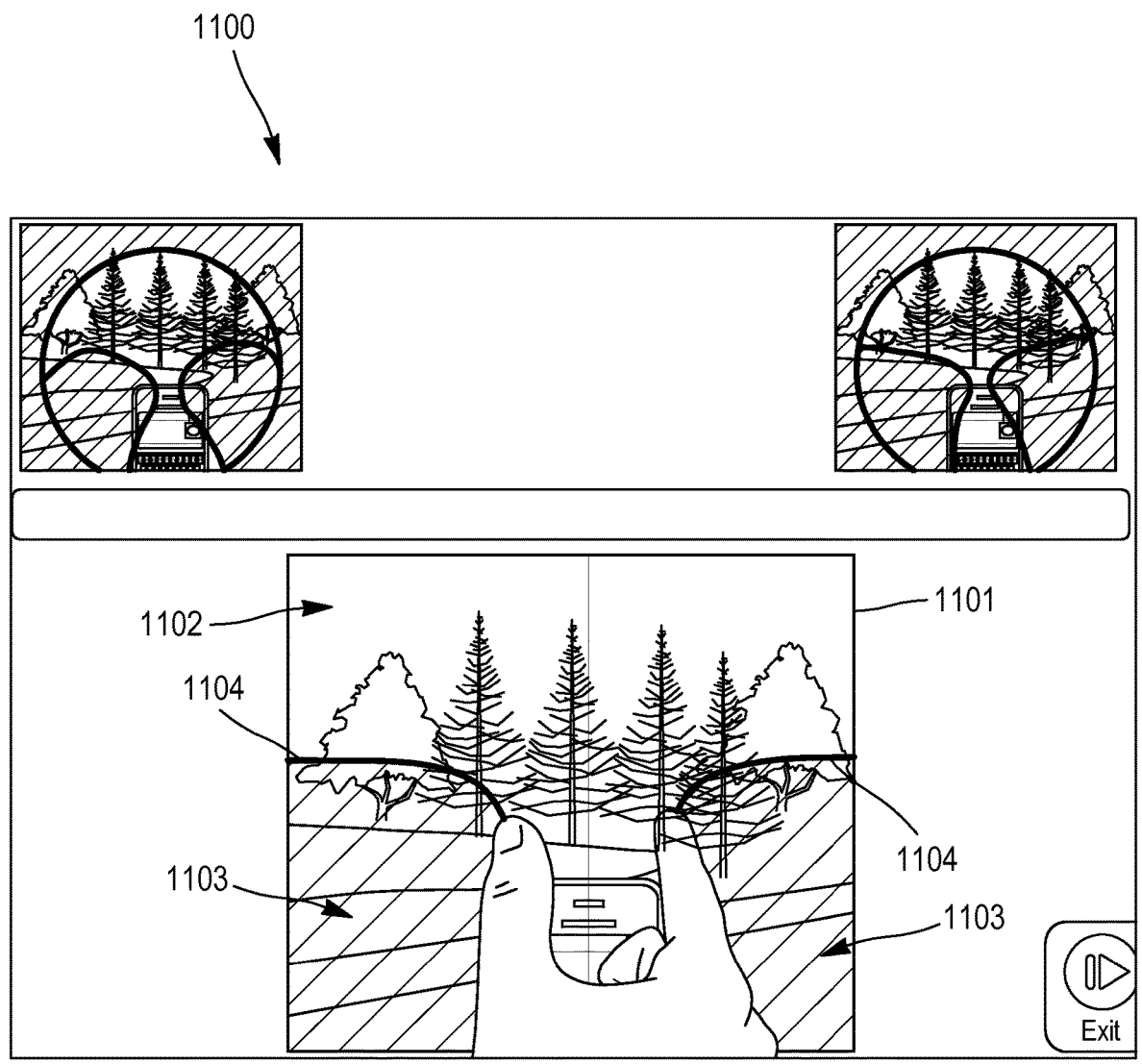

FIG. 11 illustrates another method for modifying a progressive lens design.

Figure 12:
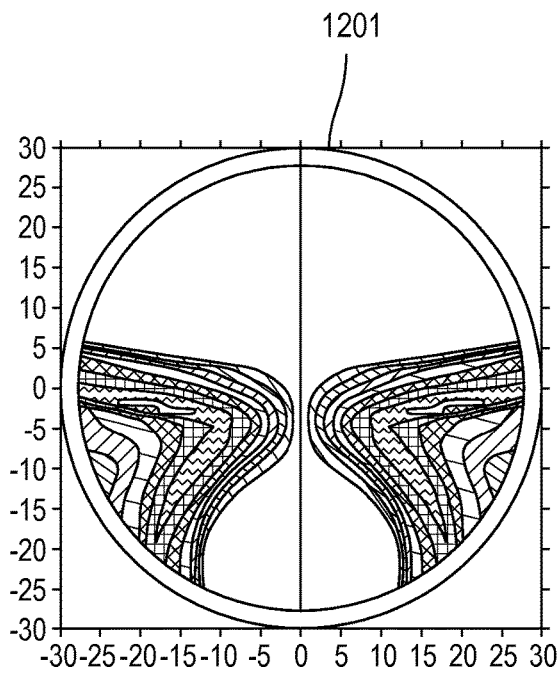
Figure 12:
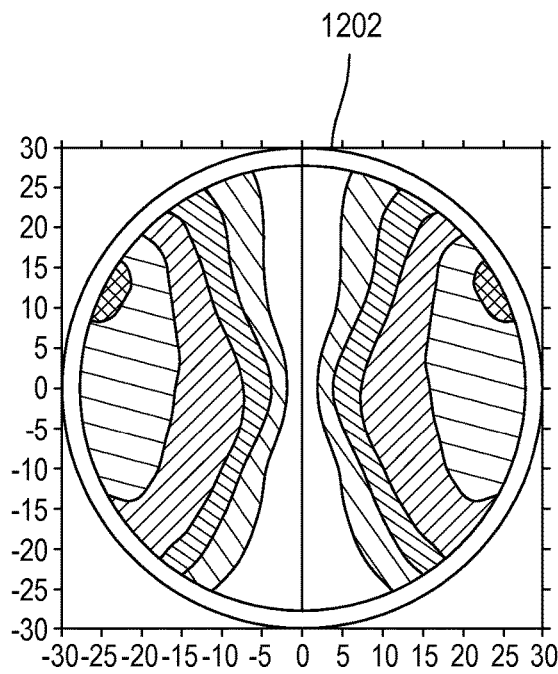
Figure 12:
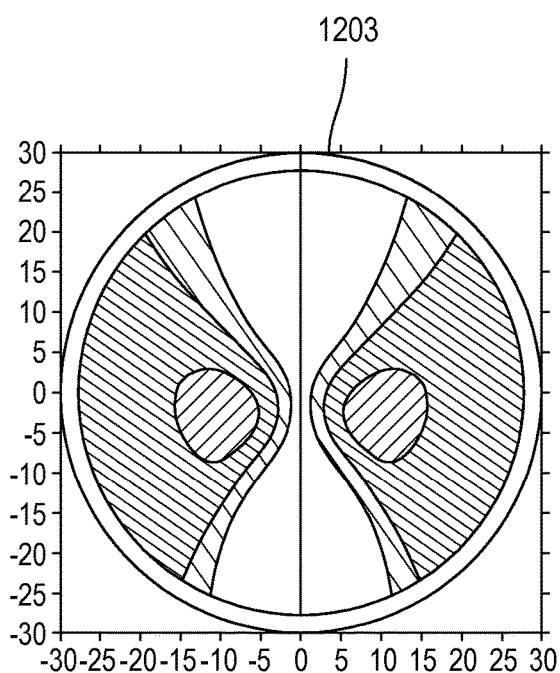
Figure 12:
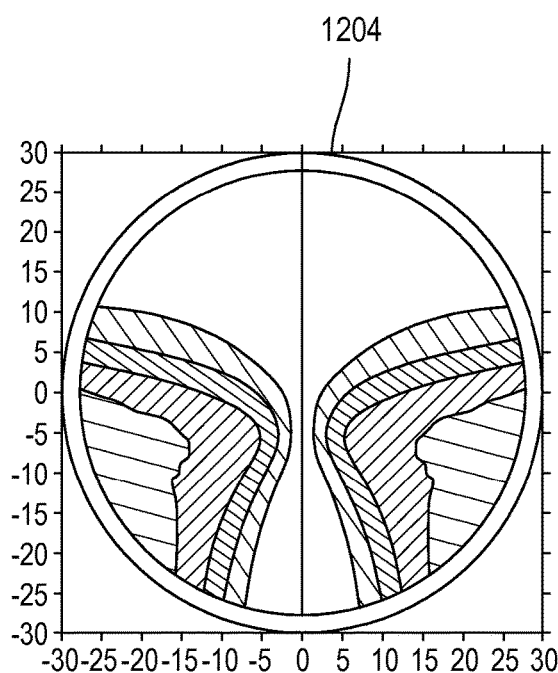

FIG. 12 illustrates four example cornerstone progressive lens designs.

Figure 13:
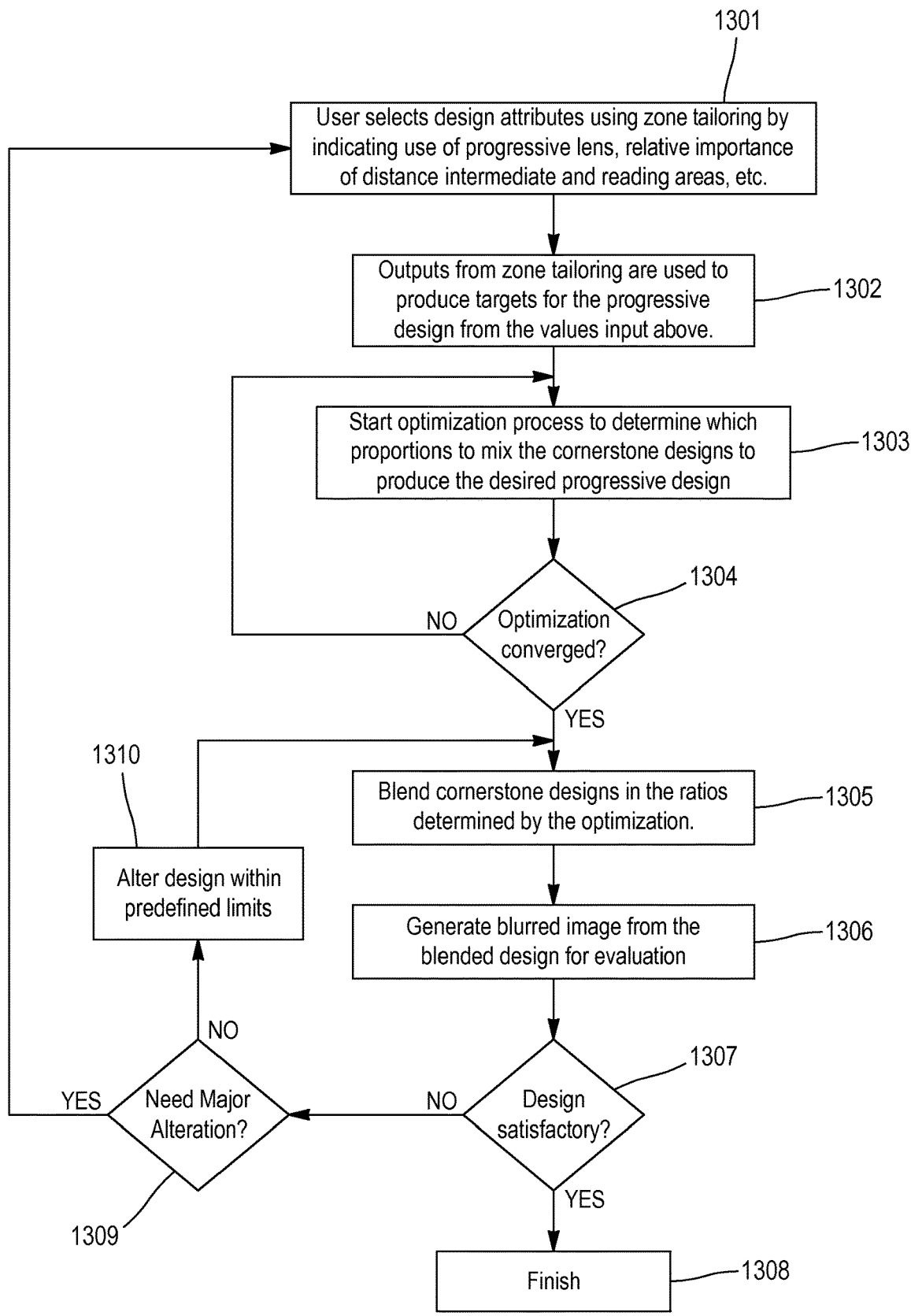

FIG. 13 is a flowchart illustrating a process for operating a progressive lens design system according to one embodiment.

SUMMARY

The invention relates to a method implemented by computer means for determining a progressive lens optical design suitable for specific user's need, comprising:
   i) receiving user inputs in a zone-tailoring phase;
   ii) determining an initial progressive lens optical design based upon the zone-tailoring phase inputs;
   iii) displaying the initial progressive lens optical design and two boundary progressive lens optical designs to the user;
   iv) receiving inputs indicating that the modified progressive lens optical design should be closer to one of the boundary designs and one or more additional user inputs in a fine-tuning phase;
   v) modifying the initial progressive lens optical design based upon the inputs indicating that the modified progressive lens optical design should be closer to one of the boundary designs and based upon the fine-tuning phase inputs to determine a modified progressive lens optical design;
   vi) displaying the modified progressive lens optical design to the user;
   vii) receiving an indication regarding whether additional modifications to the optical design are needed by the user;
   viii) in response to the received indication being indicative of additional modifications to the optical design are needed by the user, repeating steps iv) to vii); and
   ix) in response to the received indication being indicative of no additional modifications being needed, determining data representative of a final progressive lens optical design from the modified progressive lens optical design.

According to further embodiments which can be considered alone in any possible combination:
   the method further comprises manufacturing a progressive lens at a lens manufacturing side, based at least on the data representative of the final progressive lens optical design; wherein the displaying according to step iii) and step vi) are done at a lens ordering side; and wherein the modifying according to steps i) and v) is done at a lens determining side; and/or the zone-tailoring phase comprises:
  receiving user inputs indicating an intended use of the progressive lenses; and
  receiving user inputs indicating a current lens type worn by the user; and/or
the determination of the initial progressive lens optical design according to step ii) is determined based on a weighted combination of a plurality of pre-existing cornerstone progressive lens optical designs and wherein modifying the progressive lens optical design according to step v) implies a further modification of said weighted combination based on the one or more additional user inputs; and/or
displaying the initial progressive lens optical design to the user further comprises:
  generating a blurred image from the initial progressive lens optical design; and
  overlaying the blurred image on an image of a real-world scene; and/or
the real-world scene is selected by the user; and/or
the method further comprises:
  generating an updated blurred image from the modified progressive lens optical design; and
  overlaying the updated blurred image on the image of the real-world scene; and/or
the fine-tuning phase comprises receiving user inputs indicating changes in a boundary between distorted and clear areas in the initial progressive lens optical design; and/or
the fine-tuning phase comprises in response to the received indication being indicative of additional modifications to the optical design are needed by the user, repeating steps i) to vii).

The invention further relates to a system for determining a progressive lens optical design comprising:
  at a lens ordering side, user's input collecting means to collect user's input related to zone tailoring and/or user's input indicating that a modified progressive lens optical design should be closer to one of two boundary designs and/or one or more additional user's input and/or indication regarding whether additional modifications to the optical design are needed by the user;
  at a lens determining side, lens optical design determining means configured to:
    receive user's input from lens ordering side, user's inputs being related to zone tailoring and/or indicating that a modified progressive lens optical design should be closer to one of the two boundary designs and/or one or more additional user's input;
    determine an initial progressive lens optical design based at least upon user's input related to the zone tailoring;
    determine a modified progressive lens optical design based on the user's input indicating that the modified progressive lens optical design should be closer to one of the two boundary designs and/or based on the one or more additional user's input; and
    send to lens ordering side, data representative of the initial progressive lens optical design and/or of the modified progressive lens optical design; and
  at a lens ordering side, progressive lens optical design display means configured to display the initial progressive lens optical design, and/or the two boundary progressive lens optical designs, and/or the modified progressive lens optical design.

According to further embodiments which can be considered alone in any possible combination:
  the system further comprises a database configured to store pre-existing corner stone progressive lens optical designs, the database being connected to the optical design determining means and wherein the lens optical design determining means are further configured to determine the initial progressive lens optical design and/or the modified progressive lens optical design based on a weighted combination of a plurality of said pre-existing cornerstone progressive lens optical designs; and/or
  the zone-tailoring input comprises data representative of the relative importance of a plurality of progressive lens zone and/or data representative of the softness of a progressive lens optical design; and/or
  the progressive lens optical design display means is further configured to display a blurred image based upon an initial progressive lens optical design, wherein the blurred image indicates clear and distorted areas on an image of a real-world scene.

Embodiments of the invention provide patients with premium progressive lenses that are tailor-made to the user's specific and unique requirements and preferences. An interactive progressive lens optical design determining system provides progressive lens optical design determining technology that allows patients (or eye care professional, optician, etc.) to alter a progressive lens optical design in real-time, while continually displaying the selected lens' optical performance, until the most suitable lens optical design has been determined. The wording "optical design" is a widely used wording known by a man skilled in the art in ophthalmic domain to designate the set of data indicative of a dioptric function of an ophthalmic lens. The wording "dioptric function" corresponds to the optical lens power (mean power, astigmatism, etc.) as a function of the gaze direction. Each ophthalmic progressive lens can be provided with a specific "optical design" depending on a specific user's need so as to restore a presbyope's ability to see clearly at all distances but also to optimally respect physiological visual functions such as foveal vision, extra-foveal vision, binocular vision and to minimize unwanted astigmatisms. For example but not limited to, a progressive lens "optical design" data may comprise data indicative of power profile along the main gaze directions (meridian line) used by the lens wearer during day life activities, and distributions of powers (mean power, astigmatism, etc.) on the sides of the lens, that is to say away from the main gaze direction.

In various embodiments, displaying the selected lens' optical design includes displaying or presenting simulated optical effects (including but not limited to dioptric effects) generated by the lens optical design to the patient in real-time, as the progressive optical design is altered. The progressive lens optical design determining system mixes or blends a number of pre-existing cornerstone optical designs in whatever varying ratios are required to determine the desired progressive lens optical design. This allows the patient to select, for example, an all-purpose progressive optical design, a lifestyle-specific progressive optical design, or an optical design that mixes features of both optical design types. The patient can then experience a display of simulated optical effects (including but not limited to dioptric effects) of the determined desired progressive lens optical design.

Information will be gathered at a lens ordering side from the patient using, for example, zone tailoring that will allow the progressive lens optical design determining system to offer appropriate designs to each patient. In various embodiments, the lens ordering side may be located at an office of an eye care professional, a kiosk, a user's home, or anywhere the patient can be presented with an interface to the progressive lens optical design system. The progressive lens optical design determining system demonstrates the performance of a progressive lens optical design to the patient by displaying a real-life view modified by the lens's optical properties. As described previously, the real-life view changes as the patient fine-tunes the progressive lens optical design during the interactive process.

The patient is first presented with simulated optical effects (including dioptric effects) of a proposed progressive lens optical design along with two other simulated optical effects of lens optical design options. The two lens optical design options are representative of limits to the possible range of lens optical design modifications. In various embodiments, the proposed progressive lens optical design initially represents a lens optical design that is midway between the two lens optical design options. If the patient is satisfied with the midway lens optical design presented initially, no further modification would be necessary. However, if desired, the patent can incrementally change the design part of the way, or fully, towards either of the design options. The patient can cause the system to modify the proposed progressive lens optical design by modifying interactively the boundaries of the proposed progressive lens optical design towards one of the lens optical design options until the desired result is achieved. The interactive modification of the progressive lens optical design can be done, for example, using touch screen technology, physical, or other graphical input means as described in greater detail below.

Embodiments of the invention provide the ability to mathematically combine and blend a number of pre-existing cornerstone progressive lens optical designs in any desired ratio. The ratio of each design used in the blending process depends upon a patient's visual needs. The progressive lens optical design determining system allows the patient, in conjunction with his or her eye care professional, to have a very large selection of optical designs and optical-performance choices for the various zones of the progressive-lens. This allows the patient and/or eye care professional to determine, for example, in real-time, a progressive lens optical design that best matches the patient's requirements. In various embodiments a patient may determine his preferred lens optical design without the assistance of his eye care professional by using a personal computer at their home, from a remote kiosk, or any number of other possible locations of the lens ordering side. In various embodiments, the lens ordering side may be located remotely, but in communication with a lens determining side. In other embodiments, the lens determining side is co-located with the lens ordering side. Regardless of its location, the lens determining side is responsible for receiving information from the lens ordering side and processing the received information to modify and determine the progressive optical lens design the patient desires.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In one embodiment, a progressive lens optical design determining system allows a user, such as a patient, eyeglasses customer, or eye care professional, to interactively determine a progressive lens optical design. Initially, at the lens ordering side, the progressive lens optical design determining system accepts the user's eyeglasses prescription, measurements for a desired frame, and the patient's physical measurements. The user then enters the patient's needs for the progressive lens to be determined. For example, the user may indicate the relative importance of the far, intermediate, and near regions of the progressive lens optical design as well as a desired relative "softness" of the optical design. This allows for the determination, at the lens determining side, of a progressive lens optical design that is specifically tailored to the individual user. As described previously, the lens ordering side and the lens determining side may be located apart from each other in various embodiments and may be co-located in other embodiments.

The progressive lens optical design determining system may provide an initial starting point or suggested progressive lens optical design based upon the user's inputs, such as the user's occupation, hobbies, or likely use of the progressive lens eyeglasses. The user then modifies the initial proposed lens optical design (e.g., by adjusting the relative importance of the far, intermediate, or near regions and the softness of the design) to determine a progressive lens optical design having the specific characteristics desired by the user. The progressive lens optical design determining system will determine, at the lens determining side, the best lens optical design based on the information provided by the user and display, at the lens ordering side, simulated optical effects of the lens optical design to the user, before the progressive lens is ever physically manufactured. This allows the user to tailor a lens to suit particular needs or preferences. For example, the user may determine a progressive lens optical design based upon his everyday life and the tasks that he needs eyeglasses to perform. The system may be used to determine progressive lens optical designs for a specific task or lifestyle as well as progressive lens optical designs for general use.

In one embodiment, the system uses pre-existing cornerstone optical designs that can be stored remotely and accessed over a network by the progressive lens optical design determining system. Remotely storing the pre-existing cornerstone optical designs allows the optical designs to be stored in a central database and managed from a single location. In other embodiments, the pre-existing cornerstone optical designs are stored locally, or in any combination of local and remote storage. A number of these pre-existing cornerstone optical designs can be individually weighted and combined to generate a specific progressive lens optical design corresponding to user's needs. It is important to note that rather than using only objective criteria, the system also considers subjective feedback from the user into determining the lens optical design. Once the relevant weight and combination of the pre-existing cornerstone optical designs is calculated and the desired progressive lens optical design has been determined, the data representative of the desired progressive lens optical design may be sent to a lens manufacturing side to manufacture a progressive lens incorporating said desired progressive lens optical design. A lens manufacturing side may be located anywhere in which the capability to manufacture lens from the data representative of the desired progressive lens optical design exists. For example, the lens manufacturing side may be located at a traditional optical laboratory, at an office of an eye care professional, a kiosk, a residence, or any number of other locations.

FIG. 1 is a flowchart illustrating an overview of a process for using the progressive lens optical design determining system according to one embodiment. In step 101, the user provides input regarding his needs and expected use of the progressive lens. For example, the user inputs may identify a need for an office lens that does not correct fully for far vision, but that is better than an all-purpose progressive for near and intermediate vision. Alternatively, the user inputs may identify a need for a driving lens that does not correct fully for near vision, but that is better than an all-purpose progressive for far and intermediate vision.

The user's input may be collected, for example, using a zone-tailoring interface to gather information that will allow the progressive lens optical design software to offer appropriate designs. In other embodiments, a questionnaire or survey may be used to collect user input regarding a desired progressive lens optical design. The information provided via the zone-tailoring interface or collected in a questionnaire or survey allows the system to determine how to prioritize the different progressive lens zones for each particular user.

In step 102, the system determines an initial progressive lens optical design based upon the user inputs in the zone-tailoring interface. The system determines the initial lens optical design as a weighted sum of a plurality of cornerstone designs based at least upon user input entered in the zone-tailoring phase. For example, the initial lens optical design may be adapted for all purpose, office use, or driving use as indicated by the user. Depending on the type of lens the patient requests, default settings for the progressive lens zones are offered in the initial lens optical design. In step 103, the system displays the initial lens optical design to the user in a "through the lens" scene that illustrates the clear and distorted areas in the lens optical design.

In step 104, the user may provide additional input to modify the current lens optical design. For example, the user may change the relative importance of the far, intermediate, and near zones or the softness of the progressive lens optical design. In step 105, the system determines a revised progressive lens optical design based upon the user's modifications. The revised progressive lens optical design is generated by recalculating the plurality of weighted cornerstone designs to achieve the layout of the zones corresponding to the user's revised inputs. As described previously, the revised lens optical design is determined at the lens determining side, which may be located remotely or co-located with the lens ordering side.

In step 106, the system displays the revised lens optical design to the user in a through-the-lens scene that illustrates the clear and distorted areas in the modified design. In step 107, the system determines whether the user is satisfied with the current lens optical design. If not, then the process returns to step 104 and the user continues to modify the lens optical design by providing additional inputs.

Once the user is satisfied with the current lens optical design at step 107, then the user selects that final optical lens design in step 108. In step 109, the final lens design is sent to a lens manufacturing side to be manufactured. The lens manufacturing side can be any location, such as an optical laboratory where the lens can be manufactured. In other embodiments, the lens manufacturing side is located in the office of an eye care professional, in a kiosk, a residence, or any other location capable of manufacturing the lens. In various embodiments, the final lens design is sent to the lens manufacturing side in the form of an order. The order includes at least the relevant information required by the laboratory to manufacture the final lens optical design.

FIG. 2 illustrates a progressive lens zone-tailoring interface 200 according to one embodiment. Area 201 indicates the relative importance of the progressive lens zones and the softness of the progressive lens optical design. Segments 202, 203, 204 represent the relative importance of each of the far, intermediate and near vision zones, respectively. The horizontal shading across area 201 indicates the relative softness of the progressive lens optical design. As illustrated in FIG. 2, shaded areas 211, 213 are much darker than area 212, which indicates in this example a "less soft" progressive lens optical design. In other embodiments, the horizontal shading of area 201 may be softer, smoother, or less distinct to indicate a "softer" progressive lens zones.

The user provides his initial input regarding desired use (buttons 220-223) and current lens type (buttons 217-219). Buttons 220-223 allow the user to quickly select particular initial progressive lens optical designs based upon an expected use, lifestyle, hobby, etc. Button 220 allows the user to indicate that he wants an all-purpose progressive lens optical design. The distribution of segments 202-204 in FIG. 2 illustrates one embodiment of an initial all-purpose progressive lens optical design. Button 221 allows the user to indicate that he wants a progressive lens optical design primarily for office use. Button 222 allows the user to indicate that he wants a progressive lens optical design primarily for driving. Button 223 allows the user to indicate that he wants a progressive lens optical design primarily for sports.

Section 216 allows users to input a current lens type. This information may be used to select the initial progressive lens optical design softness for the user. Depending on what type of lenses the patient currently wears, a default softness of the lens optical design is offered to the user. This softness may then be modified by the user. For example, if the user selects button 217 to indicate that he is currently using bifocal lenses, the system may select an initial lens optical design that has a hard progressive lens optical design. The user may alternatively indicate that he is currently using a single vision lens with button 218, which may trigger a softer progressive lens optical design. Button 219 may be used to indicate that the user is currently using a progressive lens, which may indicate that some middle range of softness should be used for the lens optical design.

Based upon the user's initial inputs (buttons 220-223 and buttons 217-219), the system then displays an initial representation of, or a simulated optical effect generated by, the lens optical design of a progressive lens in area 201. The user may further modify the initial representation, such as by adjusting the relative importance of the near, intermediate, and far vision zones (using buttons 205, 206, 208 and 209) and by adjusting the softness of the progressive lens optical design (using buttons 214, 215). Changes to the initial progressive lens optical design can be, for example, indicated by changes in the segments' sizes and shading in area 201.

Buttons 205, 206 allow the user to adjust the relative importance 207 between the far vision zone and intermediate vision zone as indicated by the boundaries 207, 210 between segments. Button 205 moves boundary 207 up (i.e., decreases the importance of far vision zone 202 and increases the importance of intermediate vision zone 203), and button 206 moves boundary 207 down (i.e., increases the importance of far vision zone 202 and decreases the importance of intermediate vision zone 203). Similarly, buttons 208, 209 allow the user to adjust the boundary 210 between the intermediate vision and near vision zone. Button 208 moves boundary 210 up (i.e., decreases the importance of intermediate vision zone 203 and increases the importance of near vision zone 204), and button 209 moves boundary 210 down (i.e., increases the importance of intermediate vision zone 203 and decreases the importance of near vision zone 204).

Buttons 214, 215 allow the user to adjust the softness of the progressive lens optical design. Button 214 is used to indicate that the user wants a harder lens optical design, and button 215 is used to indicate that the user wants a softer lens optical design. It will be understood that in other embodiments, the lens optical design may be defined in terms of "hardness" instead of "softness."

FIG. 3 illustrates a zone-tailoring interface 300 for progressive lens optical design when the user has selected an all-purpose progressive lens optical design (button 220) and indicated that he currently uses progressive lenses (button 219). Area 301 includes segments 202, 203, 204 to represent the relative importance of the far vision zone, intermediate vision zone and near vision zone, respectively, for the all-purpose progressive lens optical design. The horizontal shading 302 of area 301 indicates a medium softness of the progressive lens vision zones.

FIG. 4 illustrates a zone-tailoring interface 400 for progressive lens optical design when the user has selected an all-purpose progressive lens optical design (button 220) and indicated that he currently uses single-vision lenses (button 218). Area 401 includes segments 202, 203, 204 to represent the relative importance of the far vision zone intermediate vision zone and near vision zone, respectively, for the all-purpose progressive lens optical design. The horizontal shading 402 of area 401 indicates a relatively softer progressive lens optical design.

FIG. 5 illustrates a zone-tailoring interface 500 for progressive lens optical design when the user has selected an office lens design (button 221) and indicated that he currently uses bifocal lenses (button 217). Button 221 allows the user to indicate that he wants an office progressive lens optical design (i.e., one that is more heavily weighted, for example, for near vision and intermediate vision), such as when he wants to ensure good vision at a desktop and computer screen distances. Area 501 indicates the relative importance of the progressive lens vision zones and the softness of the lens optical design for the initial office lens. Segments 502, 503, 504 represent the relative importance of the far vision zone, intermediate vision zone and near vision zone, respectively, which are heavily weighted in the near and intermediate vision zones.

FIG. 6 illustrates a zone-tailoring interface 600 for progressive lens optical design when the user has selected a driving lens design (button 222) and indicated that he currently uses bifocal lenses (button 217). Button 222 allows the user to indicate that he wants a driving progressive lens optical design (i.e., one that is more heavily weighted for intermediate vision and far vision), such as when he wants to ensure good vision at a dashboard and road/highway distances. Area 601 indicates the relative importance of the progressive lens vision zones and the softness of the lens optical design for the initial office lens. Segments 602, 603, 604 represent the relative importance of the far vision zone, intermediate vision zone and near vision zone, respectively, which are heavily weighted in the intermediate and far vision zones.

FIG. 7 illustrates a zone-tailoring interface 700 for progressive lens optical design when the user has selected a sports lens design (button 223) and indicated that he currently uses bifocal lenses (button 217). Button 223 allows the user to indicate that he wants a progressive lens optical design that is more heavily weighted for far vision, such as when he wants to ensure good vision of other players, balls, goals, etc. Area 701 indicates the relative importance of the progressive lens zones and the softness of the lens optical design for the initial office lens. Segments 702, 703, 704 represent the relative importance of the far vision zone, intermediate vision zone and near vision zone, respectively, which are heavily weighted in the intermediate and far vision zones.

After zone tailoring using the interface illustrated in FIGS. 2-7, the progressive lens optical design determining system moves to a fine tuning phase. First, an initial progressive lens optical design is designed based on the parameters selected in the zone tailoring section. Then, the system allows the user to modify the initial lens optical design with a controlled amount of variation. The initial progressive lens optical design is displayed to the user by presenting a picture, or simulated image, depicting what would be seen through the currently selected progressive lens optical design.

FIG. 8 illustrates a display 800 that is shown to the user based upon his initial progressive lens optical design using the parameters selected in the zone-tailoring section. In various embodiments, the display may be presented on a tablet computer, a computer monitor, a television monitor, or any other device enabled to accurately present a simulated optical effect generated by the lens optical design to a user, for example, a head mounted device. A main area 801 shows a "real-life" view 802 through the initial lens optical design. A scene having a far vision area 803 and a near vision area 804 is shown as if viewed through the lens area 802. An intermediate transition area 805 is also shown. The display also shows the shape of the clear 806 and distorted 807 areas on the progressive lens optical design.

Display 800 also shows thumbnail views 808, 809, which indicate modifications that can be made to the initial progressive lens optical design represented in main area 801. For example, thumbnail views 808, 809 indicate changes in the shape of the clear and distorted areas compared to the main view 801. The main view 801 represents a mix of the lens optical designs shown in the thumbnail views 808, 809. Bars 810, 811 indicate the proportion of each thumbnail design 808, 809 that is shown in main area 801. For example, in FIG. 8, the progressive lens optical design represented in main area 801 is a combination of half of each thumbnail design.

The user can modify the initial progressive lens optical design shown in main area 801 by selecting either thumbnail design 808, 809. For example, the user may point to and "click" on one of the thumbnail pictures using a pointing device (812) that is controlled using a mouse, track pad, touch screen, or similar device. The user may click on the desired thumbnail view to cause the main view 801 to gradually change toward the lens optical design illustrated in the thumbnail view.

FIG. 9 illustrates a display 900 that corresponds to display 800 (FIG. 8) after thumbnail 808 has been selected a number of times. The initial progressive lens optical design has been slightly modified toward the lens optical design represented in thumbnail 808. Main area 801 shows the view 802 through the modified lens optical design. The display shows how the shape of the clear 901 and distorted 902 areas on the progressive lens optical design have changed relative to display 800. Bars 903 and 904 have also changed to indicate that the view shown in main area 801 represents a higher proportion (e.g., 80-85%) of the thumbnail 808 design and a lower proportion (e.g., 15-20%) of the thumbnail 809 design.

Once the user has finished fine tuning the progressive lens and the lens optical design has been finalized, the system then outputs a file that contains sufficient information to be used by software on the lens manufacturing side to manufacture the desired progressive lenses. The file may then be transmitted along with, or as an order for the patient to the lens manufacturing side, configured to accept the file for manufacturing progressive lenses. In various embodiments, the file is stored remotely, such as in a central database, and can be accessed by lens manufacturing side upon receiving an order indicating where to access the file with the progressive lens optical design information.

FIG. 10 is an alternative embodiment of an interface 1000 for fine tuning of the progressive lens optical design options generated in the zone tailoring phase. In interface 1000, instead of displaying a midpoint of two lens optical design boundaries, the user is presented with thumbnail images 1001, 1002 of two boundary lens optical designs that were generated from the zone tailoring information. The user selects either of these boundary lens optical design options 1001, 1002, for example, by clicking with a pointing device 1003. The selected boundary lens optical design is then provided in main viewing area 1004. The user may then further modify the selected lens optical design in main viewing area 1004.

The user may make modifications to selected progressive lens optical design represented in the main viewing area 1004 using any appropriate technique available on the progressive lens optical design determining system. For example, as illustrated above in FIGS. 8 and 9, the user may select (e.g., point and click) on an input associated with a boundary lens optical design limit to incrementally move the current progressive lens optical design shown in the main viewing area 1004 toward the selected design. In other embodiments, the user may modify the shape of the clear (1005) and distorted (1106) areas, such as by "dragging-and-dropping" the boundaries (1007) between those areas.

FIG. 11 illustrates another method for modifying a progressive lens optical design. Touch-sensitive or touchscreen display 1100 includes a main area 1101 that shows a real-world view through an initial lens design. In this embodiment, the user may modify the shape of the clear (1102) and distorted (1103) areas by moving boundary 1104 using his fingers, such as by pinching, swiping, tapping, or using any other acceptable input to touchscreen 1100.

Additionally, the system has the ability to translate a contour plot into a blur mask that can be overlaid on any "real-world scene" the user chooses. The system can store a range of "real-world scenes" to best demonstrate the properties of the progressive lens optical design. For example, instead of the daytime, outdoor phone-and-park scene shown in FIGS. 8-11, the user may choose to view the progressive lens optical design with a scene having any lighting or environmental conditions (e.g., computer and office, map and road junction, or dinner table) that best reflect where the user anticipates wearing the progressive lens.

Embodiments of the invention combine two or more cornerstone progressive lens optical designs to create the user-selected final lens optical design. For example, a progressive lens optical design with a very wide reading area may be mixed with a progressive lens optical design having a very small reading area in a 1:1 ratio to determine a progressive lens optical design in which the reading area has a medium size. Expanding on this concept, the progressive lens optical design determining system uses a range of boundary designs and controls the ratio in which selected ones of these designs are mixed. This gives the system the ability to produce an infinite number of variations of progressive lens optical design with whatever optical properties the user requires.

It will be understood that the user interfaces and displays illustrated in FIGS. 2-11 are representations of certain examples and are not intended to limit how a user may operate and interact with a progressive lens optical design determining system. As described previously, the interfaces illustrated in FIGS. 2-11 may be displayed to a user using, for example, the display on a desktop, laptop, notebook, or tablet computer, a workstation, an Internet web page, a kiosk, and the like. The progressive lens optical design determining system may allow the user to input lens information using, for example, a keyboard, number pad, pointing device (e.g, a mouse, touchpad, track pad, etc.), bar code reader, specific-use buttons, switches, or sliders, touch-sensitive display screen, or any other appropriate device. Additionally, the progressive lens optical design determining system includes a processing means at a lens determining side. The processing means is configured at least to modify, determine, and receive progressive lens optical designs. In various embodiments, the progressive lens optical design determining system additionally includes a database or other storage for storing corner stone designs used in the system.

FIG. 12 illustrates four example cornerstone progressive lens optical designs 1201-1204 having preselected characteristics. Each design 1201-1204 is configured for a different combination of transitions between the reading (near) and distance vision zones of a progressive lens. The darker the area within the design indicates more distortion.

Based on the user's inputs (zone tailoring), a weighted combination of these cornerstone designs may be used to generate an initial progressive lens optical design for consideration by the user. The user may then further adjust (fine tuning) the initial design to achieve a desired final progressive lens optical design. The zone tailoring inputs may provide an initial weighting for selected cornerstone designs, and the fine tuning inputs further revise that weighting.

For example, if a user indicates that he wants a progressive lens with medium distance and medium reading vision zones, then the system may combine cornerstone designs 1201 and 1202 with an equal weighting or in a 1:1 ratio to generate an initial design. That initial design is displayed to the user with a scene showing a real-world view through the lens. The user then fine tunes the progressive lens optical design as indicated above. If, for example, the user selected a harder lens optical design during the fine tuning phase, the system may adjust the weighting in favor of the 1201 cornerstone design and display a lens optical design with a 1.2:1 ratio, for example.

It will be understood that the progressive lens optical design determining system is capable of mixing any number of these cornerstone designs in any ratio.

Each progressive lens optical design that is included in the final blended lens optical design is described by a Cartesian x,y,z point cloud (surface). Each surface must meet the following conditions:

1. The x,y point set must be identical to that of the other surfaces.

2. The surface normal at the origin must be parallel to the z axis.

It is preferable that each surface also meet the following conditions:

1. The surface power at the distance reference point should be zero.

2. The x,y distance reference point should be identical to that of the other surfaces.

3. The x,y reading reference point should be identical to that of the other surfaces.

4. The addition power should be identical to that of the other surfaces.

To blend the optical lens designs together, at each x,y point, the weighted average of the z axis coordinates is calculated according to the ratios (w) required:

$$z_b = \sum_{i=1}^{n} z_i w_i \quad \text{(Eq. 1)}$$

where:

$z_i$ is the z axis coordinate for the $i^{th}$ cornerstone design,
$w_i$ is a weight for the $i^{th}$ cornerstone design,
n=number of designs, and $$\sum_{i=1}^{n} w_i = 1 \quad \text{(Eq. 2)}$$

A method for determining the required blending ratio (w) for each design will be described for an example embodiment.

The output of zone tailoring and/or fine tuning will define the required horizontal distance between cylinder power contours of a certain level (e.g. 0.25D) at a distance reference point ($a_r$) and at a reading reference point ($c_r$).

For each progressive lens optical design, from i=1 to i=n, at both distance and reading reference points, the horizontal width between contours is calculated, wherein:

$a_i$ is the distance reference point width for design i.
$c_i$ is the reading reference point width for design i.

The predicted width between cylinder contours can then be calculated using starting values for the ratios (w).

The predicted width between contours at the distance reference point is calculated using:

$$a_p = \sum_{i=1}^{n} a_i w_i \quad \text{(Eq. 3)}$$

The predicted width between contours at reading reference point is calculated using:

$$c_p = \sum_{i=1}^{n} c_i w_i \quad \text{(Eq. 4)}$$

An error value (e) can then be calculated as a measure of how far the predicted widths are from the target widths:

$$e = (a_r - a_p)^2 + (c_r - c_p)^2 \quad \text{(Eq. 5)}$$

The error (e) can then be minimised by changing the ratios $w_1$ to $w_n$ using any suitable minimization method.

FIG. 13 is a flowchart illustrating a process for operating a progressive lens optical design determining system according to one embodiment. In step 1301, the user selects design attributes using zone tailoring. For example, the user may indicate whether they already use a progressive, bifocal, or single-vision lens and identify a relative importance of near, intermediate, and far areas of vision. In step 1302, information output from the zone tailoring phase is used to produce targets for a progressive lens optical design that meets the user's inputs.

In step 1303, an optimization process begins to determine the proportions of a group of cornerstone designs to meet the desired progressive lens optical design. In step 1304, the system evaluates whether optimization has converged. If the progressive lens optical design has not been optimized, then the process returns to step 1303 to continue the optimization process.

When the progressive lens optical design has been optimized, the process moves to step 1305 where cornerstone designs are blended in the ratios determined by the optimization process. In step 1306, a blurred image is generated from the blended cornerstone design.

The blurred image is presented to the user, who indicates whether or not the progressive lens optical design is satisfactory in step 1307. If the progressive lens optical design is acceptable, then the process is finished in step 1308 and the progressive lens optical design is used to manufacture lenses for the user. If the progressive lens optical design is not satisfactory, then the system determines if major alterations are needed in step 1309. If major alterations are not needed, then the process accepts user alterations within predefined limits, such as modifications selected from two boundary progressive lens optical designs that meet the zone tailoring inputs. The process continues at step 1305 using the altered design. On the other hand, if major alternations are needed, then the process returns to step 1301 to allow the user to redefine the zone tailoring inputs.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A computer-implemented method for determining a progressive lens optical design suitable for specific need of a user, comprising:

receiving user inputs in a zone-tailoring phase;

determining an initial progressive lens optical design based upon the user inputs in the zone-tailoring phase;

determining two boundary progressive lens optical designs being generated from the zone-tailoring information in the zone-tailoring phase, wherein the initial progressive lens optical design and the two boundary progressive lens optical designs comprise the same optical design inputted by the user in the zone-tailoring phase;

displaying simultaneously the initial progressive lens optical design and two boundary progressive lens optical designs to the user, wherein displaying simultaneously the initial progressive lens optical design and the two boundary progressive lens optical designs to the user further comprises generating a blurred image from each of the initial progressive optical lens design and the two boundary progressive lens optical designs and overlaying each blurred image on an image of a real-world scene receiving inputs indicating that a modified progressive lens optical design should be closer to one of the two boundary progressive lens optical designs and one or more additional user inputs in a fine-tuning phase;

modifying the initial progressive lens optical design based upon the inputs indicating that the modified progressive lens optical design should be closer to one of the two boundary progressive lens optical designs and based upon the one or more additional user inputs in the fine-tuning phase to determine a modified progressive lens optical design;

displaying the modified progressive lens optical design to the user;
receiving an indication regarding whether additional modifications to the optical design are needed by the user;
in response to the received indication being indicative of additional modifications to the optical design are needed by the user:
receiving inputs indicating that the modified progressive lens optical design should be closer to one of the two boundary progressive lens optical designs and one or more further user inputs in the fine-tuning phase;
modifying the initial progressive lens optical design based upon the inputs indicating that the modified progressive lens optical design should be closer to one of the two boundary progressive lens optical designs and based upon the one or more further user inputs in the fine-tuning phase to determine the modified progressive lens optical design;
displaying the modified progressive lens optical design to the user; and
in response to the received indication being indicative of no additional modifications being needed, determining data representative of a final progressive lens optical design from the modified progressive lens optical design.

2. The computer-implemented method of claim 1, further comprising:
manufacturing a progressive lens at a lens manufacturing side, based at least on the data representative of the final progressive lens optical design, wherein displaying the initial progressive lens optical design and two boundary progressive lens optical designs to the user and receiving the inputs indicating that the modified progressive lens optical design should be closer to one of the two boundary progressive lens optical designs and the one or more additional user inputs in the fine-tuning phase are done at a lens ordering side, and wherein receiving the user inputs and modifying the initial progressive lens optical design are done at a lens determining side.

3. The computer-implemented method of claim 1, wherein the zone-tailoring phase comprises:
receiving user inputs indicating an intended use of the progressive lenses; and receiving user inputs indicating a current lens type worn by the user.

4. The computer-implemented method of claim 1, wherein the determination of the initial progressive lens optical design is determined based on a weighted combination of a plurality of pre-existing cornerstone progressive lens optical designs and wherein modifying the progressive lens optical design comprises a further modification of said weighted combination based on the one or more additional user inputs.

5. (Previously Presented 1): The computer-implemented method of claim 1, wherein displaying the initial progressive lens optical design to the user further comprises:
generating a blurred image from the initial progressive lens optical design; and
overlaying the blurred image on an image of a real-world scene.

6. The computer-implemented method of claim 5, wherein the real-world scene is selected by the user.

7. The computer-implemented method of claim 1, further comprising:
generating an updated blurred image from the modified progressive lens optical design; and
overlaying the updated blurred image on the image of a real-world scene.

8. The computer-implemented method of claim 1, wherein the fine-tuning phase comprises:
receiving user inputs indicating changes in a boundary between distorted and clear areas in the initial progressive lens optical design.

9. The computer-implemented method of claim 1, wherein in response to the received indication being indicative of additional modifications to the optical design are needed by the user the fine-tuning phase comprises:
receiving additional user inputs in the zone-tailoring phase;
re-determining the initial progressive lens optical design based upon the user inputs in the zone-tailoring phase;
displaying the re-determined initial progressive lens optical design and two boundary progressive lens optical designs to the user;
receiving additional inputs indicating that the modified progressive lens optical design should be closer to one of the two boundary progressive lens optical designs and one or more additional user inputs in the one or more additional user inputs in the fine-tuning phase;
modifying the initial progressive lens optical design based upon the additional inputs indicating that the modified progressive lens optical design should be closer to one of the two boundary progressive lens optical designs and based upon one or more of the additional user inputs in the fine-tuning phase to determine the modified progressive lens optical design;
displaying the modified progressive lens optical design to the user; and
receiving an additional indication regarding whether additional modifications to the optical design are needed by the user.

10. A system for determining a progressive lens optical design comprising:
at a lens ordering side, user's input collecting circuitry configured to collect at least one of a user's input related to zone-tailoring, the user's input indicating that a modified progressive lens optical design should be closer to one of two boundary progressive lens optical designs, the two boundary progressive lens optical designs being generated from zone tailoring information in the zone-tailoring phase, one or more additional user's input and an indication regarding whether additional modifications to the optical design are needed by the user;
at a lens determining side, lens optical design determining circuitry configured to:
receive at least one of the user's input from the lens ordering side, the user's inputs being related to zone-tailoring and the user's inputs indicating that a modified progressive lens optical design should be closer to at least one of one of the two boundary designs;
determine an initial progressive lens optical design based at least upon the user's input related to the zone-tailoring;
determine a modified progressive lens optical design based on at least one of the user's input indicating that the modified progressive lens optical design should be closer to one of the two boundary designs and based on the one or more additional user's input; and send to the lens ordering side, data representative of at least one of the initial progressive lens optical design and the modified progressive lens optical design; and at the lens ordering side, a progressive lens optical design display configured to display simultaneously the initial progressive lens optical design and the two boundary progressive lens optical designs, and further configured to display the modified progressive lens optical design, wherein displaying simultaneously the initial progressive lens optical design and the two boundary progressive lens optical designs to the user further comprises generating a blurred image from each of the initial progressive optical lens design and the two boundary progressive lens optical designs and overlaying each blurred image on an image of a real-world scene, wherein the initial progressive lens optical design and the two boundary progressive lens optical designs correspond to the same optical design inputted by the user in the zone-tailoring phase.

11. The system of claim 10, wherein the system further comprises a database configured to store pre-existing corner stone progressive lens optical designs, the database being connected to the optical design determining circuitry and wherein the lens optical design determining circuitry is further configured to determine at least one of the initial progressive lens optical design and the modified progressive lens optical design based on a weighted combination of a plurality of pre-existing cornerstone progressive lens optical designs.

12. The system of claim 10, wherein the inputs related to the zone-tailoring comprise data representative of at least one of a relative importance of a plurality of progressive lens zone and data representative of softness of a progressive lens optical design.

13. The system of claim 10, wherein the progressive lens optical design display is further configured to display a blurred image based upon an initial progressive lens optical design, wherein the blurred image indicates clear and distorted areas on an image of a real-world scene.

14. A method for providing real-time generation of progressive lens designs to match needs of a user, comprising:
receiving user inputs in a zone-tailoring phase;
determining an initial progressive lens optical design based upon the user inputs in the zone-tailoring phase;
determining two boundary progressive lens optical designs being generated from the zone-tailoring information in the zone-tailoring phase, wherein
the initial progressive lens optical design and the two boundary progressive lens optical designs comprise the same optical design inputted by the user in the zone-tailoring phase;
generating a blurred image from the initial progressive lens optical design;
overlaying the blurred image on an image of a real-world scene;
displaying simultaneously the initial progressive lens optical design and the two boundary progressive lens optical designs to the user together the overlay of the blurred image on the image of the real-world scene, wherein displaying simultaneously the initial progressive lens optical design and the two boundary progressive lens optical designs to the user further comprises generating a blurred image from each of the initial progressive optical lens design and the two boundary progressive lens optical designs and overlaying each blurred image on an image of a real-world scene receiving inputs indicating that a modified progressive lens optical design should be closer to one of the two boundary progressive lens optical designs and one or more additional user inputs in a fine-tuning phase;
modifying the initial progressive lens optical design based upon the inputs indicating that the modified progressive lens optical design should be closer to one of the two boundary progressive lens optical designs and based upon the one or more additional user inputs in the fine-tuning phase to determine a modified progressive lens optical design;
displaying the modified progressive lens optical design to the user;
receiving an indication regarding whether additional modifications to the optical design are needed by the user;
in response to the received indication being indicative of additional modifications to the optical design are needed by the user:
  displaying the initial progressive lens optical design and two boundary progressive lens optical designs to the user;
  receiving inputs indicating that the modified progressive lens optical design should be closer to one of the two boundary progressive lens optical designs and one or more further user inputs in a fine-tuning phase;
  modifying the initial progressive lens optical design based upon the inputs indicating that the modified progressive lens optical design should be closer to one of the two boundary progressive lens optical designs and based upon the one or further additional user inputs in the fine-tuning phase to determine the modified progressive lens optical design;
displaying the modified progressive lens optical design to the user; and
in response to the received indication being indicative of no additional modifications being needed, determining data representative of a final progressive lens optical design from the modified progressive lens optical design.

15. The method of claim 14, further comprising:
manufacturing a progressive lens at a lens manufacturing side, based at least on the data representative of the final progressive lens optical design, wherein displaying the initial progressive lens optical design and two boundary progressive lens optical designs to the user and receiving the inputs indicating that the modified progressive lens optical design should be closer to one of the two boundary progressive lens optical designs and one or more additional user inputs in the fine-tuning phase, and wherein receiving the user inputs and modifying the initial progressive lens optical design are done at a lens determining side.

16. The method of claim 15, wherein the zone-tailoring phase comprises:
receiving user inputs indicating an intended use of the progressive lenses; and receiving user inputs indicating a current lens type worn by the user.

17. The method of claim 16, wherein the determination of the initial progressive lens optical design is determined based on a weighted combination of a plurality of pre-existing cornerstone progressive lens optical designs, and wherein modifying the progressive lens optical design comprises a further modification of said weighted combination based on the one or more additional user inputs.

18. The method of claim 17, wherein the real-world scene is selected by the user.

19. The method of claim 18, further comprising:
   generating an updated blurred image from the modified progressive lens optical design; and
   overlaying the updated blurred image on the image of the real-world scene.

20. The method of claim 19, wherein the fine-tuning phase comprises receiving user inputs indicating changes in a boundary between distorted and clear areas in the initial progressive lens optical design.

* * * * *